United States Patent
Schlesener et al.

(10) Patent No.: US 7,924,812 B1
(45) Date of Patent: *Apr. 12, 2011

(54) DOMAIN AND SERVICE BASED UPDATE MESSAGING

(75) Inventors: Matthew C. Schlesener, Olathe, KS (US); Pallavur A. Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2018 days.

This patent is subject to a terminal disclaimer.

(21) Appl. No.: 10/858,915

(22) Filed: Jun. 2, 2004

(51) Int. Cl.
*H04L 12/66* (2006.01)
(52) U.S. Cl. ........................ 370/352; 370/401
(58) Field of Classification Search .................. 370/352, 370/401, 353, 354, 355, 356; 709/231
See application file for complete search history.

(56) References Cited

U.S. PATENT DOCUMENTS

| | | | | |
|---|---|---|---|---|
| 6,215,790 | B1 * | 4/2001 | Voit et al. ...................... | 370/401 |
| 2002/0167946 | A1 * | 11/2002 | Gallant ........................ | 370/389 |
| 2002/0169887 | A1 * | 11/2002 | MeLampy et al. ............ | 709/231 |
| 2003/0095542 | A1 * | 5/2003 | Chang et al. ................. | 370/352 |

OTHER PUBLICATIONS

Schlesener, Matthew C., "Performance Evaluation of Telephony Routing over IP (TRIP)," submitted to the Department of Electrical Engineering and Computer Science and the Faculty of the Graduate School of the University of Kansas in partial fulfillment of the requirements for the degree of Master's of Science, Dec. 2002.

* cited by examiner

*Primary Examiner* — Fan Tsang
*Assistant Examiner* — Simon King (57) ABSTRACT

A communication network comprising a plurality of domains, a first location server of a first domain of the plurality of domains, and a first gateway coupled to the first location server and configured to interwork communications between the first domain and a second domain of the plurality of domains wherein the plurality of domains provide a plurality of services. The first gateway, responsive to a first status change associated with a first service of the plurality of services provided by the second domain, transfers a first update message to the first location server wherein the first update message indicates the first gateway, the first status change, the second domain, and the first service. The first location server, responsive to receiving the first update message, processes the first update message to determine a third domain of the plurality of other domains that provides the first service and transfers a second update message to a second location server of the third domain wherein the second update message indicates the first gateway, the first status change, the second domain, and the first service.

21 Claims, 5 Drawing Sheets

DOMAIN AND SERVICE BASED UPDATE MESSAGING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to packet communication technologies, and in particular, to domain and service based update messaging systems and methods for packet based communication networks.

2. Description of the Prior Art

Packet based communication networks package and transmit communications based on packet protocols. Recent advances in packet based communications have resulted in packet based voice communication networks. Voice over Internet Protocol (VoIP) typifies modern packet based voice communication protocols. VoIP networks digitize, compress, and convert voice communications to IP packets. Media gateways extend VoIP calls between and across network domains. Location servers perform call processing to control media gateways, setup and take down calls, and otherwise manage VoIP network operations.

Often times, a VoIP call originates and terminates within the same network domain. In such a case, a gateway is not required for the call. However, when a VoIP call reaches across domains, gateways are utilized to bridge the call between the domains. Gateways perform various functions depending upon the type of domains between which the gateways handle calls. For example, some gateways handle calls between VoIP networks and regions of the public switched telephone network (PSTN). These gateways convert communications to and from packet based protocols and time division multiplexed (TDM) protocols for the PSTN. Other gateways handle calls between separate VoIP networks. These gateways perform border control functions between the various VoIP networks.

Location servers process call requests from VoIP users and determine where and how calls should be routed. Gateways are assigned to specific location servers. Typically, the location servers exchange messaging regarding the status of gateways across the networks. The location servers then update routing tables on the status of the gateways and access the routing tables to determine routes for calls.

In situations where a call remains within a domain, the location servers access a routing table to select a route within the domain for the call. In situations where the call reaches across one or more domains, the location server accesses a routing table to select a first gateway for the call. Another gateway receives notification of the call and accesses its routing table to select either the remainder of the route for the call or to select a second gateway for the call to reach another domain. Some examples of domains include enterprise networks such as a corporate VoIP network. Another example includes a campus VoIP network.

One problem associated with VoIP networks is that, often times, different domains possess different capabilities at different times. For instance, some domains may provide advanced services such as Centrex. However, occasionally the Centrex services go offline or otherwise change status. Some domains offer services such as international calling, whereas other domains do not. For example, a region of the PSTN may include an international switch that provides for connecting international calls. Thus, a gateway that interfaces between a VoIP domain and the switch interworks communications for international calls. However, if the international switch goes offline, there is no mechanism by which to efficiently reconfigure location server routing tables.

Additionally, current location servers utilize a flooding mechanism to update other location servers on the status of media gateways. Such flooding mechanisms introduce a large amount of message traffic that can cause congestion in the location servers. In the preceding example, when a particular domain goes offline, the location server associated with the gateway serving the offline domain floods other location servers with update messages. It would be beneficial for a system to target the recipients of update messages rather than transmitting a flood of update messages.

SUMMARY OF THE INVENTION

An embodiment of the invention solves the above problems and other problems with a system, method, and software that provide update messaging based on services and domains associated with the services. A communication network in an embodiment of the invention comprises a plurality of domains, a first location server of a first domain of the plurality of domains, and a first gateway coupled to the first location server and configured to interwork communications between the first domain and a second domain of the plurality of domains wherein the plurality of domains provide a plurality of services.

The first gateway, responsive to a first status change associated with a first service of the plurality of services provided by the second domain, transfers a first update message to the first location server wherein the first update message indicates the first gateway, the first status change, the second domain, and the first service. The first location server, responsive to receiving the first update message, processes the first update message to determine a third domain of the plurality of other domains that provides the first service and transfers a second update message to a second location server of the third domain wherein the second update message indicates the first gateway, the first status change, the second domain, and the first service.

In another embodiment of the invention, the first domain comprises an enterprise network.

In another embodiment of the invention, the second domain comprises a public switched telephone network (PSTN).

In another embodiment of the invention, the first service comprises call forwarding.

In another embodiment of the invention, the first service comprises voice mail.

In another embodiment of the invention, the first service comprises multicast services.

In another embodiment of the invention, the first service comprises video relay services.

In another embodiment of the invention, the first status change comprises a failure of the second domain.

In another embodiment of the invention, the first status change comprises the second domain coming online.

In another embodiment of the invention, the first update message comprises a TRIP update message.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to, the specific embodiments described below, but only by the claims and their equivalents.

First Embodiment Configuration and Operation

Figure 1:
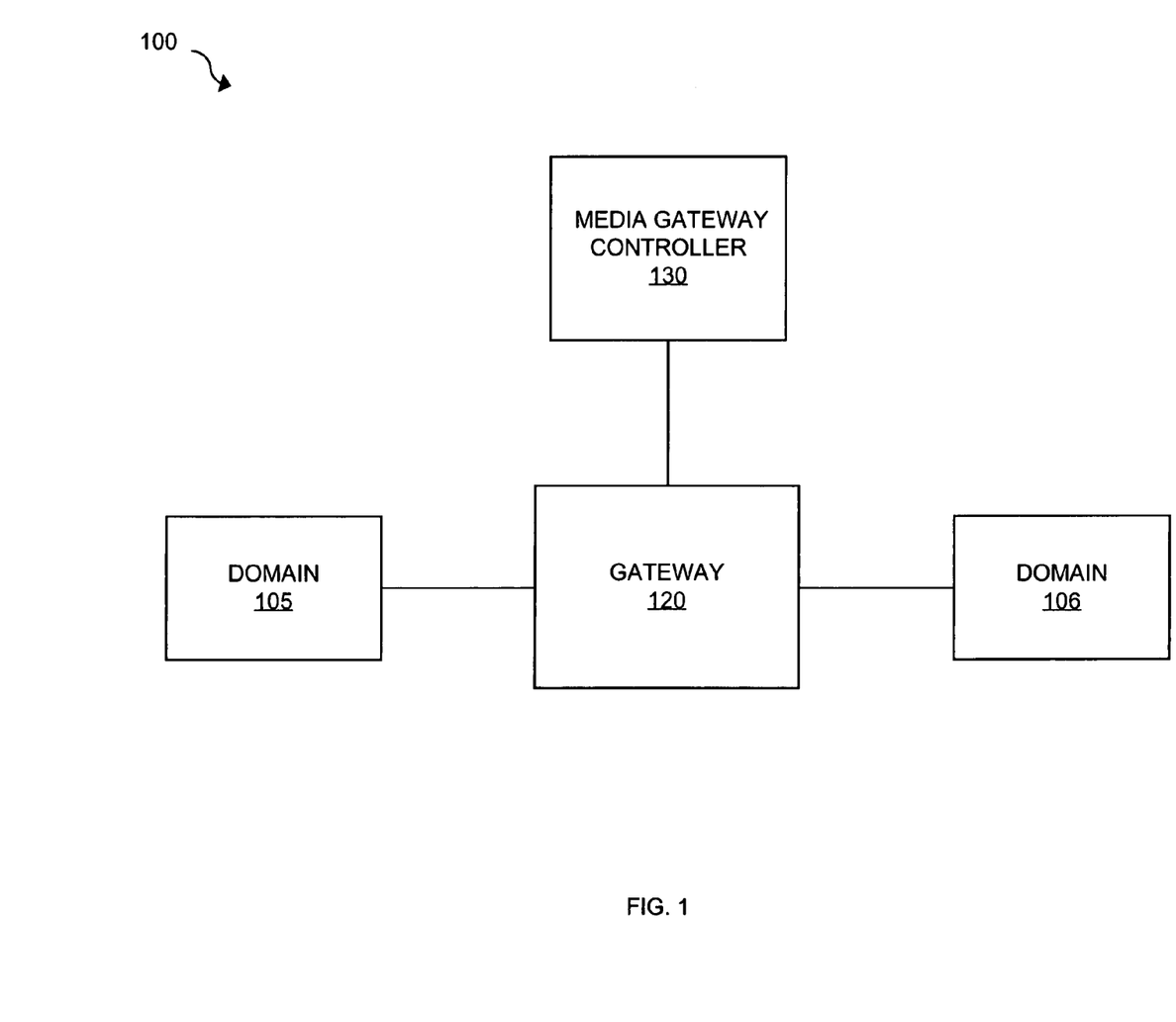
FIG. 1 illustrates a communication network in an embodiment of the invention.
Figure 2:
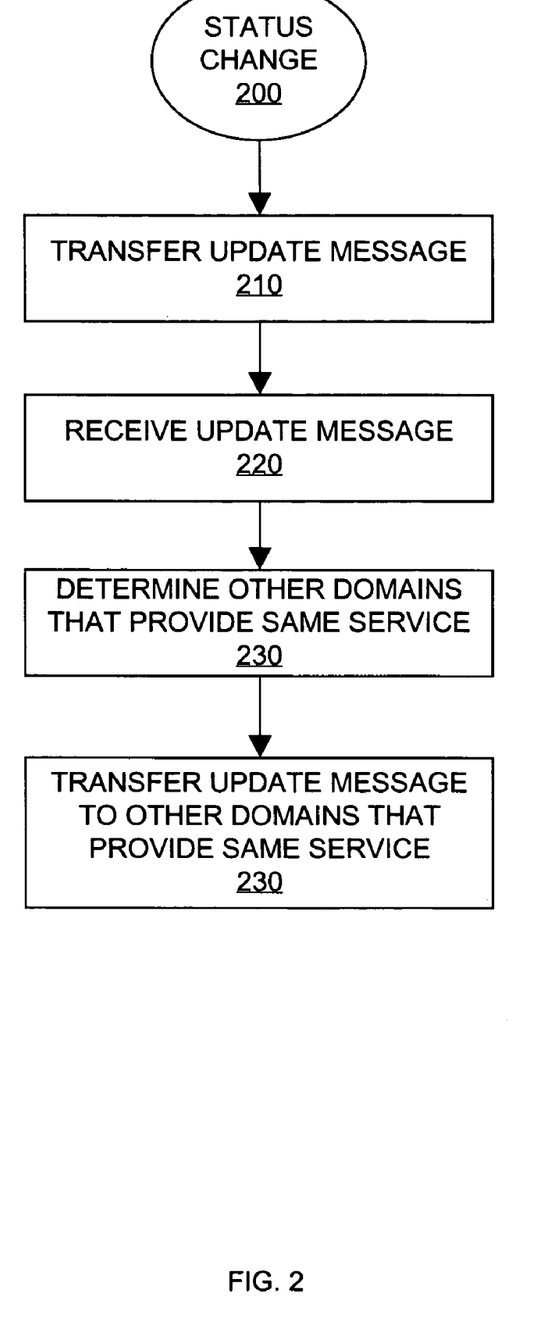
FIG. 2 illustrates the operation of the communication network of FIG. 2 in an embodiment of the invention.

FIGS. 1-2

FIG. 1 illustrates communication network 100 in an embodiment of the invention. Communication network 100 includes domain 105, gateway 120, domain 106, and location server 130. Gateway 120 is any gateway capable of interworking communications between domain 105 and domain 106. Gateway 120 is also any gateway capable of transferring update message to location server 130. Location server 130 is any location server capable of receiving update messages from gateway 120 and processing the update messages. Location server 130 is also any location server capable of transferring update messages to other location servers.

Domains 105 and 106 represent distinct communication networks or network sectors. For instance, domain 105 or 106 could be a VoIP network of a particular service provider. Domain 105 or 106 could also be an enterprise network such as a packet communication network of a corporation of university. Domain 105 or 106 primarily represents a logical boundary between sectors of a network or a logical boundary between networks.

Location server 140 controls gateway 120. Typically, a location server belongs to a particular domain and controls operations within the domain. In this example, location server 130 is associated with and of domain 105. Thus, location server 140 controls operations associated with domain 105. For example, domain 105 could represent a VoIP network and domain 106 could represent another VoIP network. Gateway 120 interworks communications between the two networks. Location server 130 is responsible for call control within domain 105, and is thereby responsible for controlling the interworking of communications by gateway 120 between domain 105 and 106.

FIG. 2 illustrates the operation of communication network 100 in an embodiment of the invention. In this illustration, gateway 120 is a TRIP-lite enabled gateway. Additionally, location server 130 is a TRIP enabled location server. Domain 105 provides a set of services to users. For example, domain 105 provides voice calling services, data services such as e-mail, video messaging, instant messaging, as well as other services not mentioned for the sake of brevity. In an example, domain 105 provides IP Centrex services such as caller identification, call forwarding, determining if a called party is busy, voicemail, as well as other services.

Gateway 120 undergoes a status change with respect to a service of domain 105 (Step 200). For instance, gateway 120 could go offline, come online, increase capacity, or indicate congestion with respect to a service of domain 105. Domain 105 could indicate to gateway 120 that it is not able to support one of the services. For instance domain 105 could notify gateway 120 that instant messaging services are temporarily disabled. In response to the status change of the service of domain 105, gateway 120 transfers an update message to location server 130 (Step 120). The update message indicates the gateway, the status change, the service affected by the status change, and the domain, domain 105.

Location server 130 receives the update message (Step 220) processes the update message to determine another domain that provides the same indicated service (Step 230). Location server 130 then transfers an update message to another location server of the other domain that provides the same indicated service (Step 240). The update message from location server 130 indicates gateway 130, the status change, the service affected by the status change, and the other domain.

Advantageously, communication network 100 provides for efficient update messaging between and among VoIP networks. One of the most significant drawbacks to implementing VoIP networks has been low quality of service. For example, in times of message congestion, important update messages from gateways get dropped by location servers to relieve message congestion. An embodiment of the invention reduces message congestion by limiting the distribution of update messages to relevant domains. Rather than flooding other location servers with update messages regarding each and every gateway a sending media gateway is in communication with, only relevant domains having the particular service are targeted. In another advantage of the invention, the status of various services across networks is updated, thereby providing improved routing for sessions requiring particular services.

Second Embodiment Configuration and Operation

Figure 3:
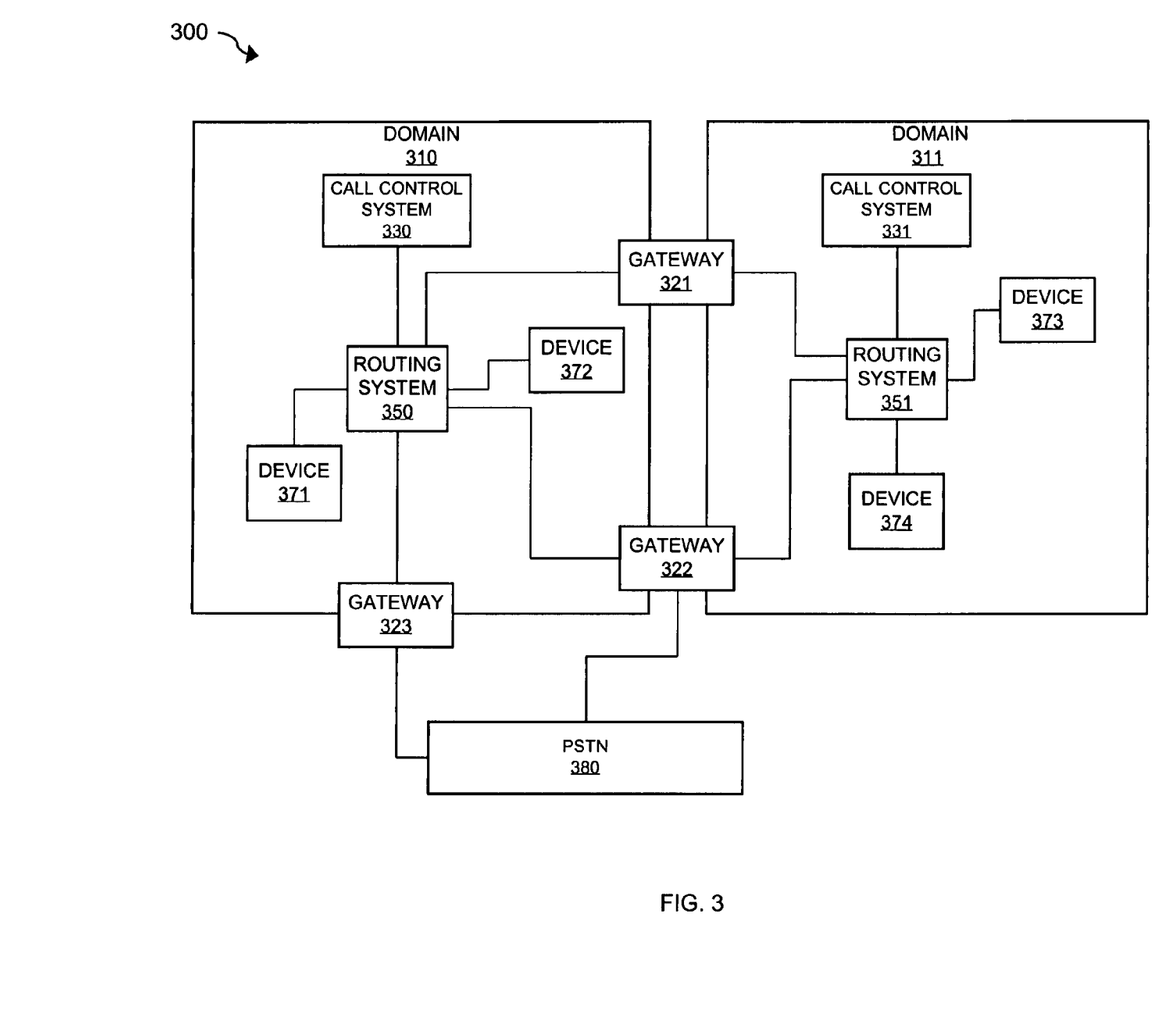
FIG. 3 illustrates a communication network in an embodiment of the invention.
Figure 4:
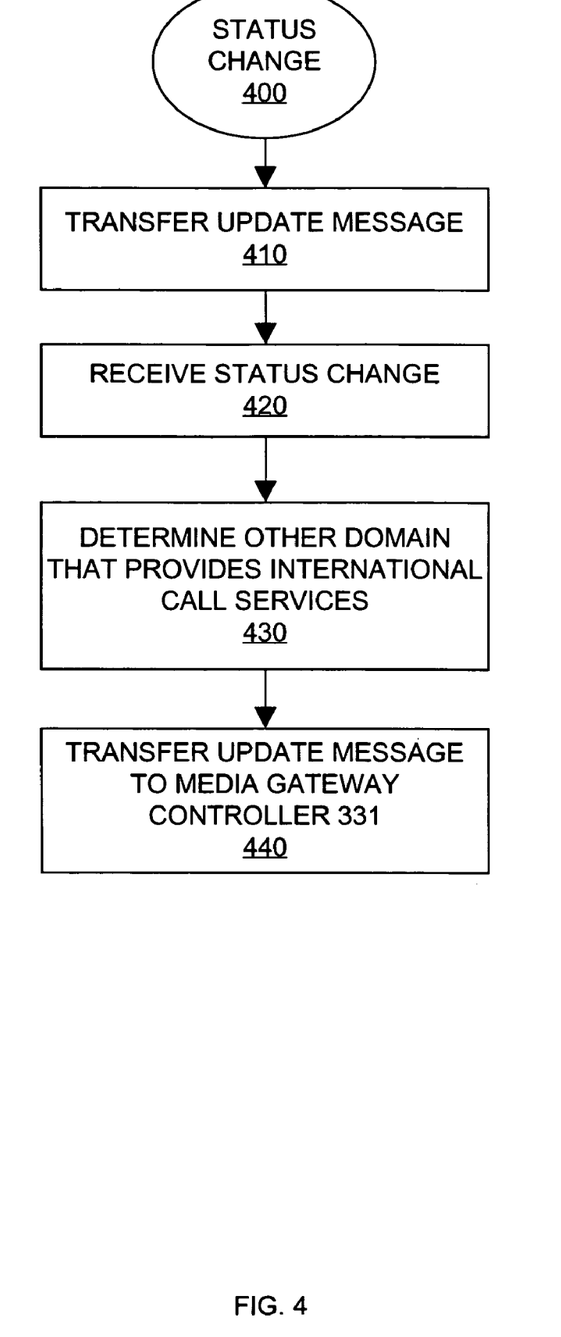
FIG. 4 illustrates the operation of the communication network of FIG. 3 in an embodiment of the invention.

FIGS. 3-4

FIG. 3 illustrates communication network 300 in an embodiment of the invention. Communication network 300 includes domain 310, domain 311, and PSTN 380. Gateways 321 and 322 interwork communications between domain 310 and domain 311. Domain 310 includes routing system 350, call control system 330, device 371, and device 372. Domain 311 includes routing system 351, call control system 331, device 373, and device 374. Gateway 322 also interworks communications between domain 310 and PSTN 380 and between domain 311 and PSTN 380. Gateway 323 interworks communications between domain 310 and PSTN 380.

Domains 310 and 311 represent distinct networks or network sectors. For example, domains 310 and 311 could each represent a corporate network, a local area network (LAN), a service provider network, as well as other types of networks. Devices 371 and 372 are communication devices such as wireline phones, wireless phones, hand held computers, laptop computers, or other computational and communication devices. Users use devices 371 and 372 to access services of domain 310. Devices 373 and 374 are communication devices such as wireline phones, wireless phones, hand held computers, laptop computers, or other computational and communication devices. Users use devices 373 and 374 to access services of domain 311.

Gateway 323 interworks communications from domain 310 to a region of PSTN 380. For example, gateway 323 could interwork communications to and from a particular area code of PSTN 380. Similarly, gateway 322 interworks communications to and from a region of PSTN 380. Gateways 321, 322, and 323 are any gateway capable of interworking communications. Additionally, gateways 321, 322, and 323 are any gateway capable of transmitting update messages to call controls system 330 and 331. Routing systems 350 and 351 are any routing systems capable of routing communications between the various elements of domain 310 and domain 311. Routing system 350 and 351 are comprised of elements well known in the art such as routers, as well as other elements. The elements of domains 310 and 311 are in communication with each other through routing systems 350 and 351 as is well known in the art.

In this embodiment, domains 310 and 311 are networks providing VoIP services. The following describes the specialized signaling protocols employed by VoIP network elements, such as location servers 330 and 331, and gateways 321, 322, and 323 to set up and tear down VoIP calls. Specialized signaling is also utilized to locate users across the various VoIP networks. Session Initiation Protocol (SIP) is an example of a popular VoIP signaling protocol.

SIP provides advanced signaling and control to VoIP networks for initiating, managing, and terminating VoIP network sessions, or calls. A typical SIP enabled VoIP network includes user agents, proxy servers, and media gateways. User agents are the end users of a SIP network. User agents can be the origin or destination for a call over a VoIP network. A user runs a soft client on, for example, a SIP phone. It is assigned an identifier, such as SIPuser@domain.com, and can receive incoming calls and place outgoing calls. Media gateways interwork communications for calls that either originate or terminate outside of a VoIP network. Proxy servers (also commonly referred to as location servers) provide registration, redirect, and location services implemented by registrar, redirect, and location server applications running on the proxy servers. In particular, registrar servers manage user agents assigned to their network domains. Redirect servers redirect SIP messages to their appropriate destinations and return location information in response to queries. Location servers share responsibility for knowing the location and status of each gateway.

Telephony Routing over Internet Protocol (TRIP) is a protocol established to effectuate messaging between location servers and gateways to keep track of the location and status of the gateways. TRIP does not run directly over IP—it must ride over a telephony protocol like SIP or H.323. IP does not provide the infrastructure (e.g. SIP proxy server and media gateway) nor the packet structure to provide what TRIP needs to do its very specific job (dynamic building of proxy server routing tables). In a SIP only network, location servers are not utilized; rather, the proxy server will use standard Domain Name Service (DNS) methods to determine where to forward call requests. In a TRIP enabled SIP network, the location server builds a dynamic routing table based on TRIP update messages transmitted from various media gateways and location servers. The location server then accesses the resulting TRIP routing table to determine where to forward and redirect call requests.

TRIP enabled location servers are often referred to as TRIP speakers. A scaled down version of TRIP called TRIP-lite can be implemented on gateways. TRIP-lite transmits messaging from a gateway to at least one location server advertising the available routes and prefixes accessible through that gateway. For example, a first TRIP-lite enabled gateway might advertise to a location server that it services the 913 area code of the public switched telephone network (PSTN), while a second TRIP-lite enabled gateway advertises to the location server that it services the 816 area code of the PSTN. Thus, when a call request indicating a PSTN area code of 913 arrives into the location server, the location server knows to route that call to the first TRIP-lite enabled gateway. Other attributes advertised by TRIP-lite enabled gateways include destination prefixes, capacity to each prefix destination, and utilization levels of each trunk group terminating at the gateway. TRIP-lite allows location servers to have real-time knowledge of available gateway resources.

In this illustration, devices 371, 372, 373, and 374 are session initiation protocol (SIP) enabled devices. Call control systems 330 and 331 are SIP and TRIP enabled. Additionally, gateways 321, 322, and 323 are TRIP-lite enabled gateways. Domain 310 provides a set of services such as voice services, instant messaging, video multicast, voicemail, as well as other services. Domain 311 also provides a set of services such as voice services, instant messaging, video multicast, voicemail, as well as other services. Gateways 321, 322, and 323 support the various services of domains 310 and 311.

In an example of the operation of communication network 300, gateway 322 is in communication with a switch of a region of PSTN 380. Gateway 322 exchanges signaling with the switch as is well known in the art. Typically, the switch transmits signaling indicative of a voice call request from an origin in PSTN 380. Gateway 322 forwards the call request to, for example, call control system 300. Call control system 330 processes the call request to determine a route for the call and responds to gateway 322 with routing instructions. Gateway 322 responds to the switch to setup the call and the first leg of the call is extended from the switch to gateway 322.

In the interim, call control system 330 has communicated with the call destination, for example, device 371. SIP enabled device 371 had earlier notified call control system 330 of its presence in domain 310. As part of the response from call control system 330 to gateway 322, gateway 322 was notified of the appropriate address for device 371. After call setup is finished, gateway 322 interworks communications for the call between the originating caller on PSTN 380 and device 371.

As illustrated, call control system 330 processes the initial voice call request from the switch of PSTN 380 to determine an appropriate route for the call. In this example, the request is for voice services. However, in other examples, the call request might be for other services such as instant messaging, video conferencing, or other services. Depending upon the type of each gateway or the status of each gateway, some routes may be more optimal than other routes. Thus, call control system 330 processes call requests to determine optimal routes. It is therefore important that call control system 330 has an updated routing table indicating the most current status of any gateway.

FIG. 4 illustrates the operation of communication network 300 in an embodiment of the invention. To begin, gateway 323 experiences a status change with respect to a particular service. As discussed above, gateway 323 is coupled to a region of PSTN 380. For example, gateway 323 could be coupled to the 413 area code and interworks communications between domain 310 and the 413 area code. Such an arrangement requires that gateway 323 is coupled to a switch of PSTN 380 that services the 413 area code. PSTN 380 can be considered a domain and therefore includes elements such as the switch. The switch has certain capabilities such as international call routing. As is well known in the art, domestic switches route domestic calls, whereas other switches have the ability to route calls internationally.

In this example, the status change experienced by gateway 323 (Step 400) is a notification by the switch coupled to gateway 323 that international calling services are disabled. Such an event could occur by, for example, a trunk line from the switch to an international switch going offline. Gateway 323 registers the notification and in response transfers a TRIP update message to call control system 330 (Step 410). The update message indicates that international calls through the region of PSTN 380 coupled to gateway 323 are disabled.

Call control system 330 receives the update message (Step 420) and updates a TRIP routing table based on the domain (PSTN region), the status change (disabled), gateway (gateway 323), and indicated service (international calling). Call control system 330 also processes the update message to determine other domains that provide international calling (Step 430). For example, another switch coupled to gateway 322 provides access to another region of PSTN 380. That switch could provide international call services. Assuming that domain 311 provides for and allows international calling from devices 373 and 374, call control system 330 transfers an update message to call control system 331 indicating the status change of gateway 323 and the service associated with the status change (Step 440). Call control system 331 can then update its TRIP routing table based on the new status of gateway 323 with respect to international call services.

As a result of transferring an update message from call control system 330 to call control system 331, any users with domain 311 desiring to place an international call will be routed through gateway 322 rather through gateway 321 to gateway 323, and then to an international switch of PSTN 380. Additionally, any caller within domain 310 desiring to place an international call will be routed to gateway 322 and to an international switch of PSTN 380. Advantageously, call control system 330 only transmits an update message to call control system 331 rather than flooding every other call control system with update messages. Thus, domains that do not provide for or allow international calls are not burdened with update messages related to international call services.

Figure 5:
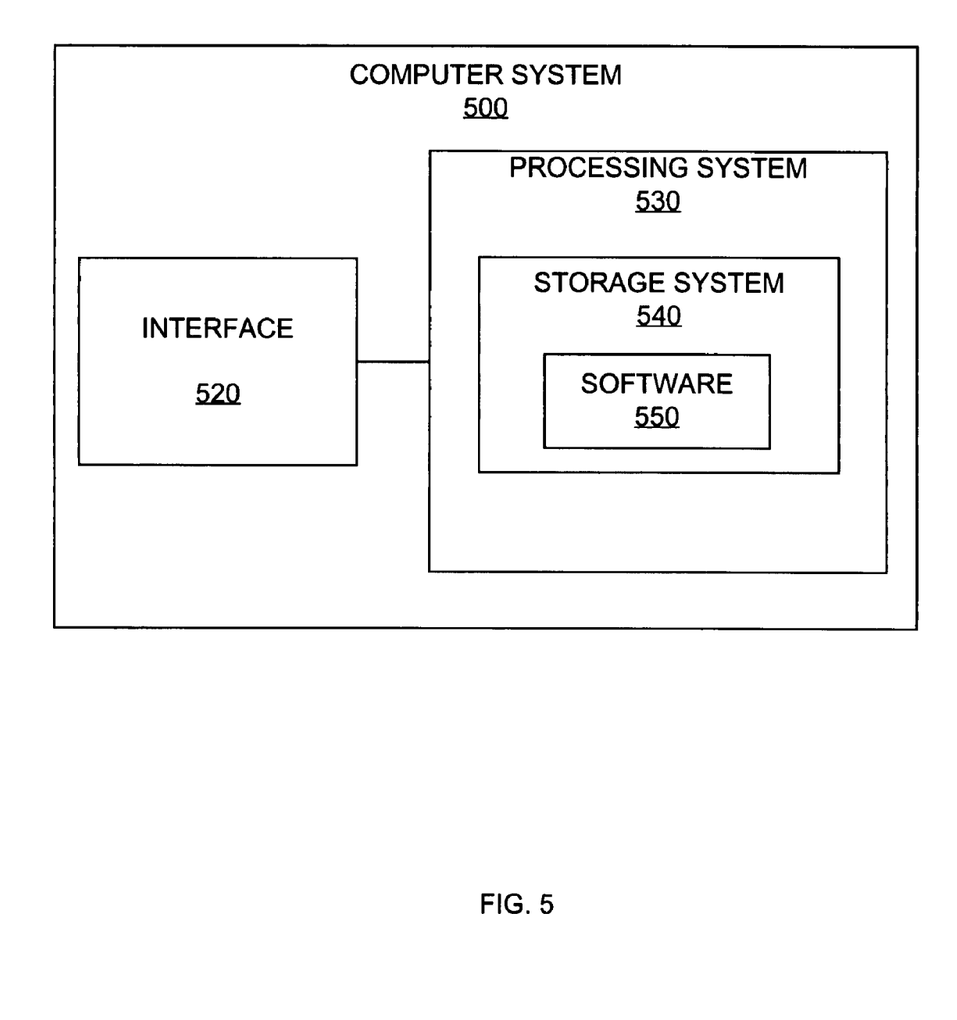
FIG. 5 illustrates a computer system in an embodiment of the invention.

Computer System—FIG. 5

FIG. 5 illustrates computer system 500 in an embodiment of the invention. Computer system 500 includes interface 520, processing system 530, storage system 540, and software 550. Storage system 540 stores software 550. Processing system 530 is linked to interface 520. Computer system 500 could be comprised of a programmed general-purpose computer, although those skilled in the art will appreciate that programmable or special purpose circuitry and equipment may be used. Computer system 500 may use a client server architecture where operations are distributed among a server system and client devices that together comprise elements 520-550.

Interface 520 could comprise a network interface card, modem, port, or some other communication device. Signaling interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for communication networks 100 and 300.

What is claimed is:

1. A communication network for interworking communications between a Voice over Internet Protocol (VoIP) domain and one or more other domains providing a plurality of services, comprising:
    a first location server of a VoIP domain; and
    a first gateway coupled to the first location server and configured to interwork communications between the VoIP domain and a second domain;
    the first gateway, responsive to a first status change associated with a first service provided by the second domain, transfers a first update message to the first location server wherein the first update message indicates the first gateway, the first status change, the second domain, and the first service;
    the first location server, responsive to receiving the first update message, processes the first update message to determine a third domain that provides the first service and transfers a second update message to a second location server of the third domain wherein the second update message indicates the first gateway, the first status change, the second domain, and the first service.

2. The communication network of claim 1 wherein the second domain comprises a VoIP network.

3. The communication network of claim 1 wherein the second domain comprises a public switched telephone network (PSTN).

4. The communication network of claim 1 wherein the first service comprises call forwarding.

5. The communication network of claim 1 wherein the first service comprises voice mail.

6. The communication network of claim 1 wherein the first service comprises multicast services.

7. The communication network of claim 1 wherein the first service comprises video relay services.

8. The communication network of claim 1 wherein the first status change comprises a failure of the second domain.

9. The communication network of claim 1 wherein the first status change comprises the second domain coming online.

10. The communication network of claim 1 wherein the first update message comprises a TRIP update message.

11. A method of operating a communication network for interworking communications between a Voice over Internet Protocol (VoIP) domain and one or more other domains providing a plurality of services, comprising a first location server of a VoIP domain, a first gateway coupled to the first location server and configured to interwork communications between the VoIP domain and a second domain, the method comprising:

transferring a first update message from the first gateway to the first location server responsive to a first status change associated with a first service provided by the second domain wherein the first update message indicates the first gateway, the first status change, the second domain, and the first service;

receiving the first update message from the first gateway;

processing the first update message to determine a third domain that provides the first service; and transferring a second update message to a second location server of the third domain wherein the second update message indicates the first gateway, the first status change, the second domain, and the first service.

12. The method of claim 11 wherein the second domain comprises a VoIP network.

13. The method of claim 11 wherein the second domain comprises a public switched telephone network (PSTN).

14. The method of claim 11 wherein the first service comprises call forwarding.

15. The method of claim 11 wherein the first service comprises voice mail.

16. The method of claim 11 wherein the first service comprises multicast services.

17. The method of claim 11 wherein the first service comprises video relay services.

18. The method of claim 11 wherein the first status change comprises a failure of the second domain.

19. The method of claim 11 wherein the first status change comprises the second domain coming online.

20. The method of claim 11 wherein the first update message comprises a TRIP update message.

21. A software product for operating a first location server of a Voice over Internet Protocol (VoIP) domain and one or more other domains providing a plurality of services, the software product comprising:

software operational when executed by a processor to direct the processor to receive a first update message from a first gateway coupled to the first location server and configured to interwork communications between the VoIP domain and a second domain wherein the first gateway transfers the first update message to the first location server responsive to a first status change associated with a first service provided by the second domain wherein the first update message indicates the first gateway, the first status change, the second domain, and the first service, and wherein the software further operational when executed by the processor to direct the processor to process the first update message to determine a third domain that provides the first service, and transfer a second update message to a second location server of the third domain wherein the second update message indicates the first gateway, the first status change, the second domain, and the first service; and a non-transitory storage medium configured to store the software.

* * * * *